United States Patent Office 3,022,212
Patented Feb. 20, 1962

3,022,212
PROCESS FOR HEAT STAMPING THERMO-
PLASTIC MATERIALS
Russell L. Butler, Midland, Mich., assignor to The Dow
Chemical Company, Midland, Mich., a corporation of
Delaware
No Drawing. Filed Sept. 10, 1956, Ser. No. 608,712
5 Claims. (Cl. 156—238)

This invention relates to an improved process for heat stamping and marking thermoplastic materials. More particularly it relates to such a process for heat stamping and marking thermoplastic oriented films.

Thermoplastic films have found widespread use as packaging materials. As commonly prepared such films are of a single solid color or transparent. In that way a wide variety of articles may be packaged from a common inventory of film. However, after packaging a ready means for identifying the contents of the package is required particularly where the packages are stored in bins, cartons, and shelves so that the contents are not visible. With the unoriented films, such as polystyrene, cellulosic materials, and the like, it is possible to transfer an ink coated on a suitable substratum to the film by means of a heating bar. That method will not work with the oriented films such as those prepared from the normally crystalline vinylidene chloride polymers because those films shrink when heated giving a shirred effect to the package. The usual heat stamping methods are also not useful with those films and foils having low softening points since they are easily distorted and rendered commercially useless. The application of pressure-sensitive adhesive-backed marking tapes to the films is a costly and time consuming process. All other attempts at providing color indicia to oriented films have been unsuccessful.

In view of the above difficulty it is the principal object of this invention to provide an improved process for stamping and marking thermoplastic films.

It is a further object to provide such a process which may impress identifying color indicia to a previously filled and sealed package.

It is a still further object to provide such a process for stamping and marking oriented thermoplastic films.

Other objects will be apparent as the description of the invention proceeds.

It has now been found that thermoplastic film may be marked or stamped by placing an ink coated facing of a thin tape composed of a high dielectric material into contact with the film and subjecting both materials to the action of a radio frequency dielectric film sealer and thereafter removing the tape.

Although the process of this invention may be employed to stamp and mark any thermoplastic film, it is especially useful in stamping and marking oriented thermoplastic films, since such materials shrink when the usual heat stamping and marking methods are used. As preferred films are those oriented films prepared from the normally crystalline vinylidene chloride polymers. The process may be used with all of the thicknesses of film commonly encountered in the packaging art. Usually these films are from 0.001 to 0.003 inch in thickness. The very thin films of 0.0005 inch or less in thickness are much more difficult to stamp. Because of their thinness there is less opportunity for "absorption" of the energy to achieve the molecular excitation necessary for stamping the films. In many casses this may be overcome by resorting to higher frequencies.

The stamping tapes which may be used are well-known in commerce. Typically they consist of a carrier tape of glassine, cellophane, or other non-thermoplastic material having a coating of a sized pigment or metallic leaf on one side. Other useful tapes are certain thermoplastic carrier tapes which are made of materials which, although thermoplastic, have a low loss factor so as not to be affected by the radio frequencies used in this process. Typical of such materials are films of polystyrene and polyethylene terephthalate. The pigment or metallic leaf coating is also applied to one side of that carrier. A still further embodiment is one employing either of the above carrier tapes with a thermoplastic pigment coating. The particular type of tape which is to be used in the process will be determined by the nature of the film employed, by the type of marking desired, and by practical considerations such as cost and availability. A trained investigator will be able to make a judicious selection of a tape with but simple preliminary experiments.

Any of the commercially available radio frequency, dielectric heat sealers may be employed. As manufactured these heat sealers are adaptable for sealing flat sheets, pouches and bags, tubes and other configurations in either intermittent or continuous manner as desired. The frequencies commonly employed in sealing processes range from about 20 to 100 megacycles and those frequencies are operable in the process of this invention. It should be understood however that this process is not limited to any particular frequency range but that it requires only that the frequency used be capable of heating the film. With the preferred normally crystalline films the preferred frequency range is from 20 to 100 megacycles.

The process of the invention is adapted for either marking or stamping thermoplastic films or for simultaneously marking or stamping and sealing of those films into bags, pouches and the like.

Also it is possible to mark one or both sides of a film or sheet by means of this process by merely employing a non-thermoplastic carrier tape of the type previously described to either one or both sides of the film or sheet. In the process, the ink is transferred to the surface of the film or sheet where it is held with sufficient tenacity to withstand the normal handling operations. Although the process has been described with reference to films or sheets, it is particularly useful for marking and sealing previously filled packages or for marking sealed packages. It is only necessary that a small bit of the film of the package be available to pass between the electrodes. That may be accomplished by only partially filling the package or by using as the area to be imprinted a protruding amount of the film material extending beyond the seal.

By way of illustration, a film prepared by the thermal extrusion of a copolymer prepared from 85 percent vinylidene chloride and 15 percent vinyl chloride and subsequently oriented multidirectionally was used to make a package. An inked facing of a narrow tape of a regenerated cellulose tape was placed in contact with it along an intended seal line. The film and tape components were then run through a high frequency generator Model 110B made by the Electronic Processes Corporation, operated at a frequency of 27,120 kilocycles until the lapped edges of the copolymer were sealed. Upon removal from the machine the regenerated cellulose tape was stripped from the copolymer films leaving a colored coating of ink on the films. The copolymer films were smooth and not shrunk.

By way of contrast, when the same components were placed between the jaws of a conventional resistance heated bar sealer the copolymer film shrank resulting in an undesirable shirred effect.

I claim:
1. A process for marking and stamping thermoplastic films consisting of placing an inked facing of a stamping tape, said tape being composed of a high dielectric material, into contact with a heat-shrinkable, oriented thermoplastic film, thereafter subjecting both said film and said tape to a radio frequency field capable of heating said film, and finally stripping said tape from said film to leave an inked coating on said film.

2. The process claimed in claim 1 wherein said oriented film is one prepared from a normally crystalline vinylidene chloride polymer.

3. The process claimed in claim 1, wherein said stamping tape is composed of a non-thermoplastic material.

4. The process claimed in claim 3 wherein said non-thermoplastic material is a regenerated cellulose.

5. The process claimed in claim 3, wherein said non-thermoplastic material is glassine.

References Cited in the file of this patent
UNITED STATES PATENTS

| | | |
|---|---|---|
| 2,404,073 | Karfiol et al. | July 16, 1946 |
| 2,404,191 | Quayle et al. | July 16, 1946 |
| 2,459,623 | Cohoe et al. | Jan. 18, 1949 |
| 2,483,462 | Huebner | Oct. 4, 1949 |
| 2,510,750 | Marquardt | June 6, 1950 |
| 2,517,570 | Irons | Aug. 8, 1950 |
| 2,517,581 | Lowry et al. | Aug. 8, 1950 |
| 2,529,717 | Wenger | Nov. 14, 1950 |
| 2,631,646 | Gannon et al. | Mar. 17, 1953 |
| 2,652,088 | Weeks | Sept. 15, 1953 |
| 2,676,416 | Calosi et al. | Apr. 27, 1954 |
| 2,691,613 | Baer | Oct. 12, 1954 |
| 2,721,821 | Hoover | Oct. 25, 1955 |
| 2,747,646 | Lippman | May 29, 1956 |
| 2,810,933 | Pierce et al. | Oct. 29, 1957 |